(12) United States Patent
Kross et al.

(10) Patent No.: US 9,618,630 B2
(45) Date of Patent: Apr. 11, 2017

(54) RADIATION DETECTOR BASED ON A MATRIX OF CROSSED WAVELENGTH-SHIFTING FIBERS

(71) Applicant: JEFFERSON SCIENCE ASSOCIATES, LLC, Newport News, VA (US)

(72) Inventors: Brian J. Kross, Yorktown, VA (US); Andrew Weisenberger, Yorktown, VA (US); Carl Zorn, Yorktown, VA (US); Wenze Xi, Odenton, MD (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 0 days.

(21) Appl. No.: 15/008,499

(22) Filed: Jan. 28, 2016

(65) Prior Publication Data
US 2017/0059719 A1   Mar. 2, 2017

(51) Int. Cl.
*G01T 1/20*   (2006.01)
(52) U.S. Cl.
CPC ............ *G01T 1/201* (2013.01); *G01T 1/2018* (2013.01)

(58) Field of Classification Search
CPC .... G01T 1/20; G01T 3/00; G01T 3/06; G01T 1/201; G01T 1/2018
See application file for complete search history.

(56) References Cited

U.S. PATENT DOCUMENTS

| | | | | |
|---|---|---|---|---|
| 5,783,829 A | * | 7/1998 | Sealock | G01T 1/20 250/367 |
| 6,078,052 A | * | 6/2000 | DiFilippo | G01T 1/202 250/367 |
| 8,592,775 B2 | * | 11/2013 | Workman | G01T 3/06 250/390.01 |
| 2002/0121604 A1 | * | 9/2002 | Katagiri | G01T 3/06 250/368 |

* cited by examiner

*Primary Examiner* — David Porta
*Assistant Examiner* — Faye Boosalis

(57) ABSTRACT

A radiation detection system comprising a detection grid of wavelength shifting fibers with a volume of scintillating material at the intersecting points of the fibers. Light detectors, preferably Silicon Photomultipliers, are positioned at the ends of the fibers. The position of radiation is determined from data obtained from the detection grid. The system is easily scalable, customizable, and also suitable for use in soil and underground applications. An alternate embodiment employs a fiber grid sheet or layer which is comprised of multiple fibers secured to one another within the same plane. This embodiment further includes shielding in order to prevent radiation cross-talk within the grid layer.

4 Claims, 5 Drawing Sheets

RADIATION DETECTOR BASED ON A MATRIX OF CROSSED WAVELENGTH-SHIFTING FIBERS The United States Government may have certain rights to this invention under Management and Operating Contract No. DE-AC05-06OR23177 from the Department of Energy.

This application claims priority from U.S. Provisional Patent application No. 62/213,412 filed on Sep. 2, 2015.

FIELD OF THE INVENTION

The present invention relates to a radiation detection device and method, and, more specifically, a radiation detection device and method involving scintillation grid arrays.

BACKGROUND OF THE INVENTION

In many fields of science and industry, it is often necessary to track small amounts of radiation under difficult or physically restrictive conditions. In some cases low energy particle emitting radioisotopes, rather than high energy particle emitters, are used in scientific research projects. Low energy particle emitting radiotracers, such as $P^{32}$ and $P^{33}$, offer several benefits, such as easy disposal at the conclusion of an experiment. As a result, researchers may have a need to track low energy emissions, sometimes when such emissions are subject to migration through the ground, other substances, or even a biological entity.

One such example of this need is when researchers are attempting to track a radioactive tracer through a live plant or similar organism. Moreover, biological activity of interest often occurs in the soil, rather than in the body of a plant, so it is often necessary to be able to track the radioisotope in the soil itself as well. Conventional methods of tracking low energy particle emitting radioisotopes in soil surrounding live plant life often involve disruption of the plant's root system or environment.

Tracking low-level radiation in the soil, in general, presents numerous challenges. This makes it difficult to monitor low levels of radiation that may be present in the soil or the ground in field applications, such as might occur when a low level radioactive liquid has escaped from a nuclear facility.

Accordingly, it would be advantageous to provide a radiation detector that is capable of tracking and mapping low energy particle emitting radioisotope activity, and low level radioactive emissions, in general, in soil, ground, and similar applications.

BRIEF SUMMARY OF THE INVENTION

In its most basic form, the present invention comprises a radiation detector consisting of an interconnected grid array of wavelength-shifting optical fibers with beads of scintillating material at the interconnecting points. The terminal outputs of the fibers are read by light sensors positioned at the ends of the fiber strands. The wavelength-shifting fibers as well as the scintillators are coated with an internally reflective protective light tight paint. In an alternate embodiment, the invention comprises a grid array of two orthogonal stacks of scintillating fibers which comprise two planes.

The radiation detection system and method enables in-situ measurement of distributed radioactive tracers. The system is easily scalable and the detection grid is customizable to fit the unique geometry of individual applications. Manipulation of the layout of the detection grid array and/or planes of scintillating fibers permits an increase (or decrease) in the area of monitoring and an increase (or decrease) in the resolution of the imaging procedure. As part of such a process, additional sets of grid arrays of wavelength shifting fibers may be added to the first two embodiments or additional planes of scintillating fibers may be added to the third embodiment to create a three-dimensional detection matrix for three-dimensional imaging.

The physical arrangement and rugged nature of this device allows it to be used in in-situ applications in difficult or hazardous environments. It may, for example, be situated in soil or under the earth. The close proximity of the sensor to what is being measured allows the use of a greater variety of radiotracers including low energy particle emitter products.

DETAILED DESCRIPTION

In its most basic form, the present invention is a novel radiation detection method and apparatus for detecting, tracking, and mapping low-energy particles, such as photons, beta particles, and alpha particles. In a first preferred embodiment, the detection apparatus is a grid array of crossed wavelength-shifting optical fibers having particle detection enhancement elements located at the intersections of the crossed fibers. Multiple layers of such fibers may be used, the fibers may be oriented in various planes, and the distance between fibers altered, in order to modify the radiation imaging/detection parameters.

Figure 1:
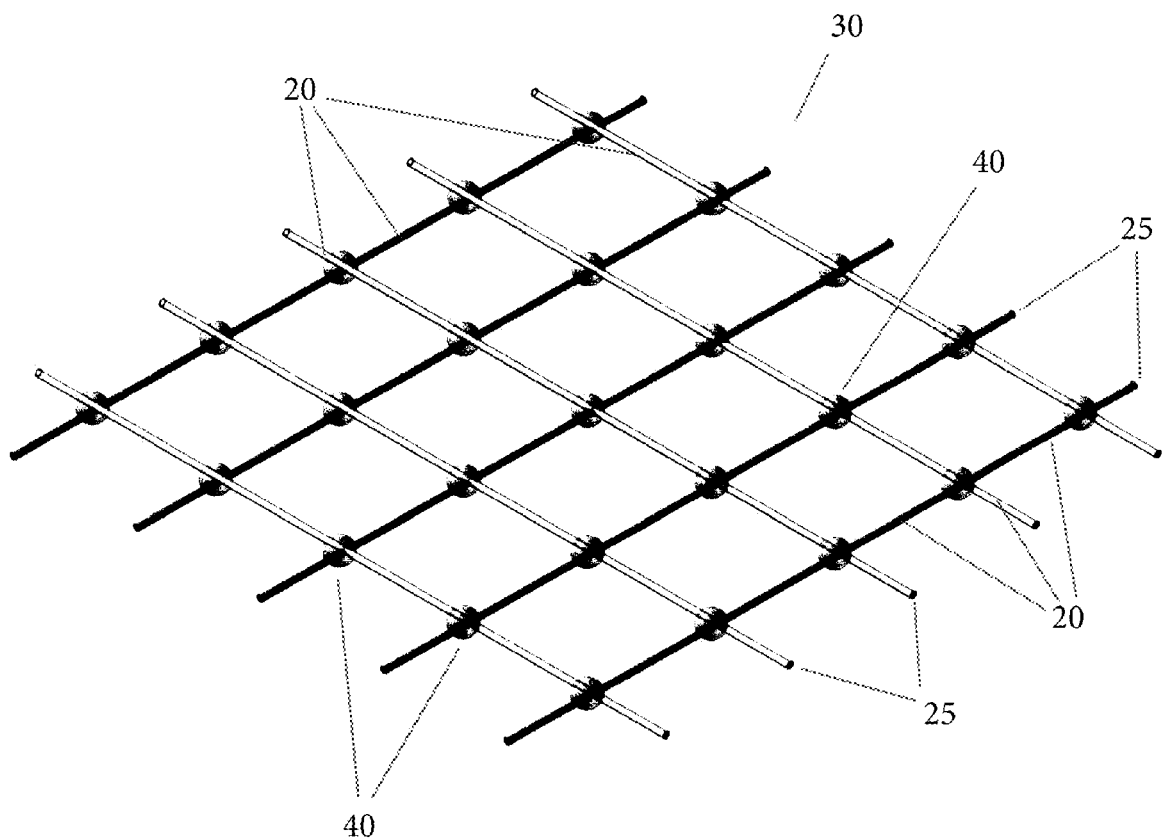
FIG. 1 is an elevation view of a first embodiment of a detector grid array.

FIG. 1 illustrates a first embodiment of the invention. As seen therein, the radiation detection device is constructed of a one layer grid array of wavelength-shifting fibers lying in a single plane. Each strand of fiber 20 is essentially a core of scintillating plastic surrounded by one or more layers of thin cladding of material or coated with internally reflective paint. Either round or square fibers may be used. When round, the fibers 20 are preferably 0.5 to 2 mm in diameter. A radiation detection grid array 30 is formed by assembling a plurality of interconnected or crossed fibers 20 as shown in FIG. 1. At each intersection of the fiber strands 20 in the grid 30, a volume of scintillating material 40 is cured, glued, or otherwise secured in place. In FIG. 1, this volume is in the form of small round beads 40 and, in the preferred embodiment, the volume of scintillating material 40 is spherical in shape.

The ends 25 of the fibers 20 are coupled to light sensors (not shown) which may be Photomultiplier Tubes (PMT) or Silicon Photomultipliers (SiPM). The currently preferred method for reading the fibers is silicon photomultipliers. While SiPMs are a relatively young technology, they are state of the art low-level light detectors for fiber detector applications such as this. At least one end of each fiber terminates in such a light sensor. It will be noted, however, that both ends of each fiber may terminate in light sensors when required by a particular application. When fibers are used with a light-sensor at one end only, the opposite terminal portion of each fiber strand 20 could be capped with a reflector or suitable reflective substance. Scintillation light from an activated bead travels through the fiber and arrives at the light sensor(s).

Figure 2:
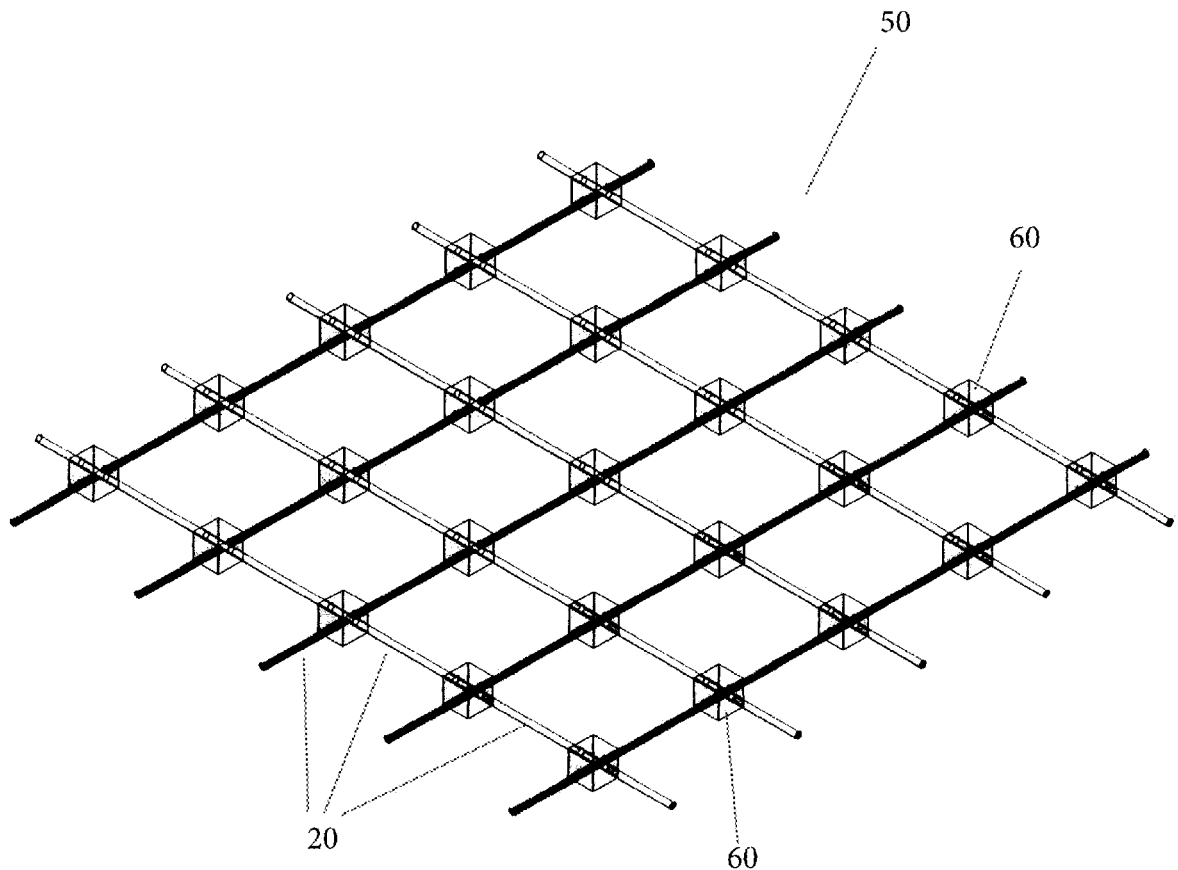
FIG. 2 is an elevation view of a second embodiment of a detector grid array.

FIG. 2 illustrates a second embodiment that relies upon a modified volume of scintillating material. FIG. 2 sets forth a scintillating fiber grid 50 that includes cubic-shaped scintillating volumes 60 at each intersection of the fibers 20. Each scintillating volume 60 is preferably a cube fabricated from scintillating material with two holes drilled perpendicular to each other enabling each fiber strand 20 to pass through the cube. The strands of the fiber grid terminate in light sensors (not shown) as described in the first embodiment.

The fibers 20 in both embodiments are preferably wavelength shifting optical fibers, most typically plastic fibers with a polystyrene core. Such fibers capture higher energy photons of the scintillation light and re-emit lower energy photons, i.e., re-emit the light at a longer wavelength. This shifting process facilitates the transmission of the scintillation light along longer sections of fibers and across bigger detection grids. As is known in the art, wavelength shifting fibers can be formed by adding a wave shifter when polymerizing the plastic.

As mentioned above, particle detection enhancement elements, e.g., the beads 40 or cubes 60, are positioned at the intersection of fibers within the grid. The detection enhancement elements are the active detector elements. The fibers 20 serve only to transmit the scintillation light to the fiber ends where the light sensor mechanism measures the light. The use of these elements, e.g., 40 and 60, results in the capture of greater amounts of radiation and the generation of more scintillation light at grid intersection points versus simply using the cross-section of strands of fibers at the intersection points. Further, the use of a spherical bead is ideal as such a shape possesses uniform geometry. As a result, the scintillation response at each element is more constant regardless of the direction of approach of the radiation being detected. These detection enhancement elements may be composed of any suitable material, such as Bicron-490 scintillator resin.

The fundamental operation of the detector can be seen by reference to FIG. 1. In its simplest form, a scintillating bead 40 will scintillate when it is exposed to radiation. The scintillation light is transferred from the respective bead 40 to both respective crossed fibers. The scintillating output of the crossed fibers, i.e. an x and y component, is read at the ends of the grid 30 by the light sensor, preferably a SiPM. As noted previously, light sensors may be positioned at a single end of each fiber (yielding one x and one y component), or, alternatively, light sensors may be positioned at both ends of each fiber (yielding two x and two y components for each "hit"). The light sensor may then be connected to an amplifier, if required, and then to an analog-to-digital converter so that the electrical pulse from the detector grid array is ultimately digitized in order to measure and quantify the radioactive emissions being monitored.

The data obtained from the light sensors can then be used to determine the location of the radiation. The detection system operates on conventional detector principals whereby a source of radiation causes one or more beads (or cubes) to scintillate. A more diffuse radiation field would trigger a greater number of beads, whereas a more localized source of radiation would result in a more limited number of "hits." Once a hit has been recorded, a coincidence gate is opened and the system evaluates any coincident events, i.e., other coincident hits. Using this method, the system determines the x and y coordinate of each hit. After collecting such information, it can count the number of hits at each point and proceed with further processing. The aggregate "hit" information is interpolated and, ultimately, the radiation may be identified, located and quantified.

Figure 3:
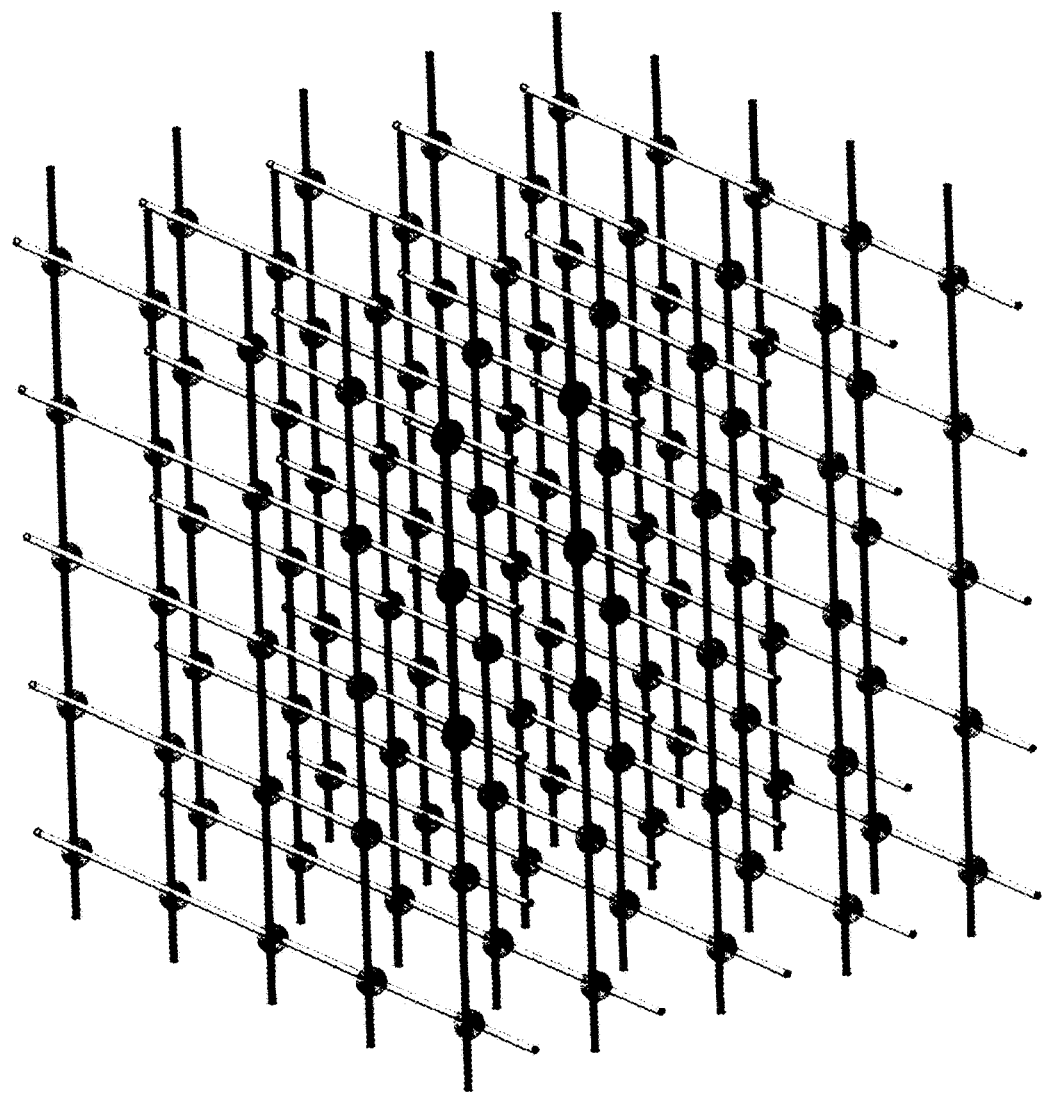
FIG. 3 is a perspective view of a three-dimensional detector grid matrix array.

Due to the nature of the apparatus, a detection grid array can be assembled to almost whatever size necessary. The design of the detection grid can be configured based upon the intended use. For example, the fiber strands 20 can be in close proximity to one another, or far apart from one another. The size of the scintillating volumes can be modified as well. Smaller beads which are spaced closer together would result in greater resolution whereas larger beads which are spaced further apart would decrease image resolution. For example, in situations where the radiation being detected is expected to be localized in nature, the detector grid can be modified by decreasing the distance between beads or other scintillating elements in order to increase the resolution of the detector for the particular application. The system may be further enhanced via the construction of a three-dimensional matrix of crossed fibers as seen in FIG. 3.

Figure 4:
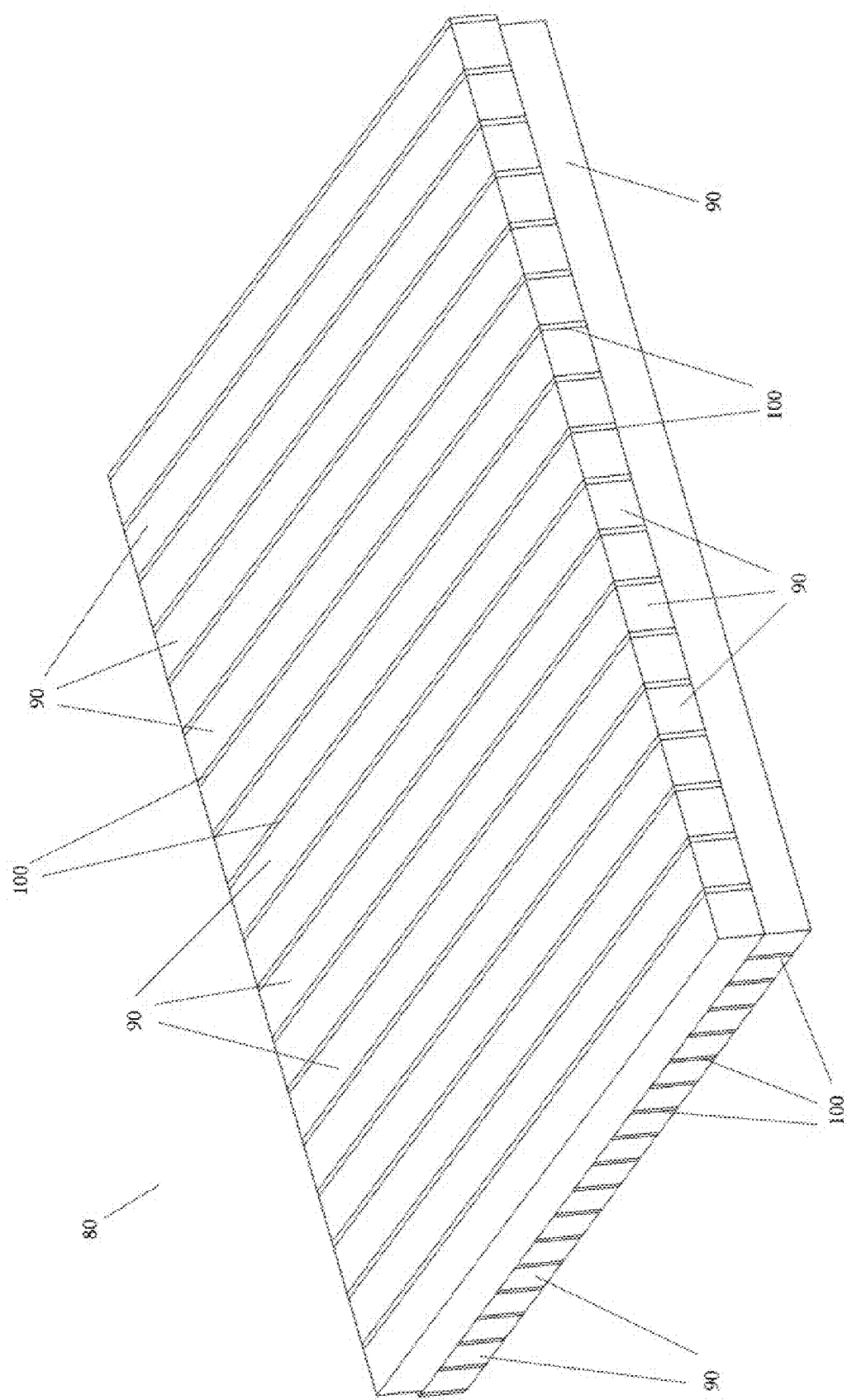
FIG. 4 is perspective view of a grid array representing a third embodiment of the invention.
Figure 5:
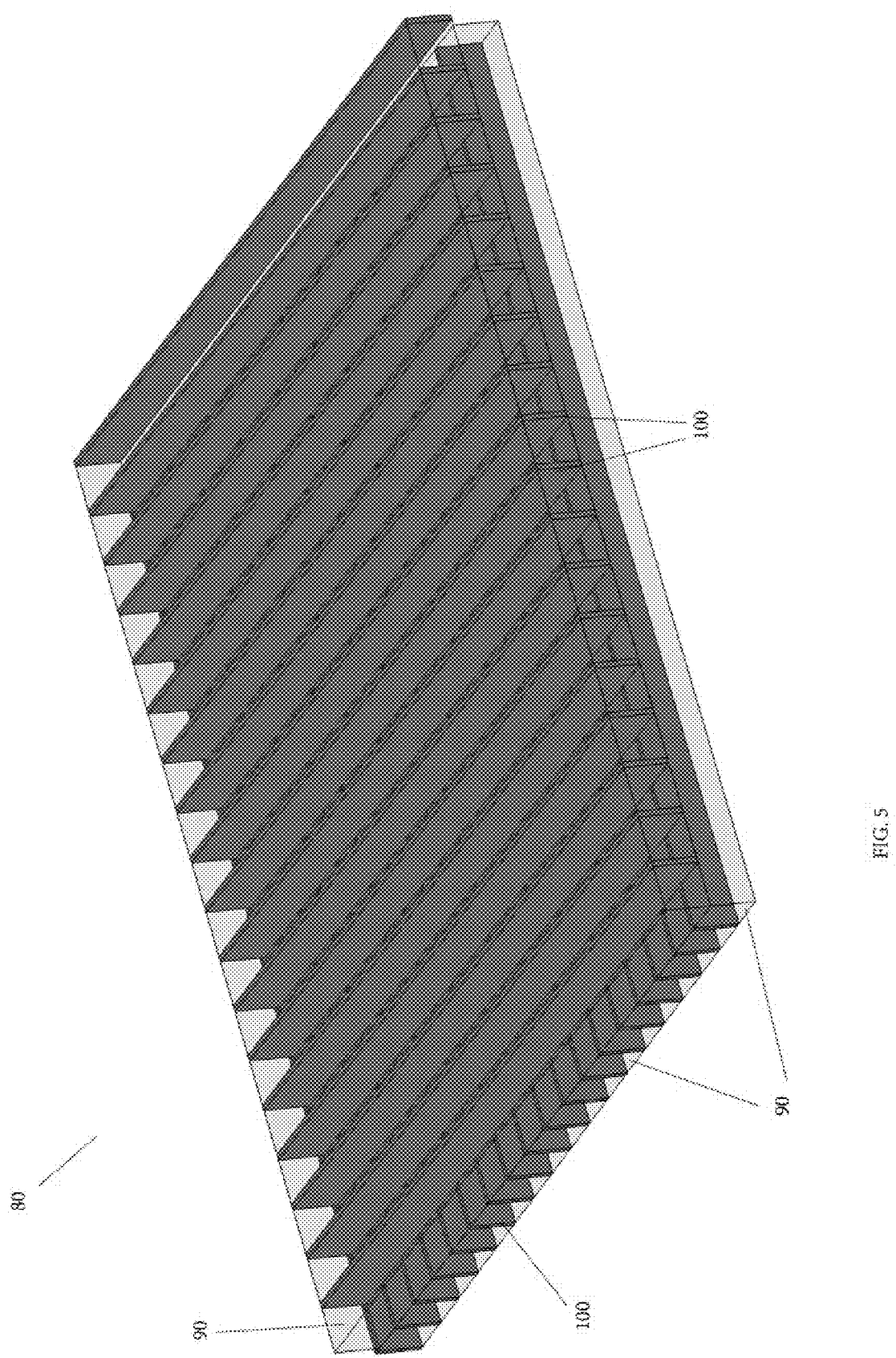
FIG. 5 is an alternate perspective view, having certain transparent elements, of a grid array of a third embodiment of the invention.

FIGS. 4 and 5 demonstrate a third embodiment of a radiation detection device according to the present invention. In this embodiment, the detection grid 80 is composed of two panels of scintillating fibers 90 which are bound or otherwise secured together. Further, a layer of dense material or metal 100, e.g., copper foil, is positioned between the fibers. This foil 100 prevents the transmission of radiation between or among the fiber strands 90 thus preventing interference with output to the light sensors but allows the forward scatter of the radiation, such as low energy beta particles, to the next detector level or plane. This embodiment does not incorporate any additional scintillating beads or other such volumes. Additional fibers or panels may be added to form a larger detection assembly.

A specific example of such an embodiment is as follows: plastic scintillating fibers, each 3.5 mm×3.5 mm in cross-section and 200 mm in length, are individually wrapped with Teflon® tape, or the equivalent, and then two of the opposing tangential sides of the fibers are covered with 0.3 mm thick copper tape. An array of such fibers are then bundled together with Kapton® tape, or its equivalent, and both exposed fiber terminal cross-sections are polished for light coupling. Respective fibers are each read by the same mechanism described in the prior embodiments discussed herein. It will be noted that a radiation detector according to these principles can also be formed of fibers having geometric shapes other than a square.

A radiation detector can thus be formed from crossed panels of scintillating fibers each having a thin layer of copper between each fiber to prevent radiation cross-talk. As a result, the target radioactive emissions only cause detectable scintillation in a single fiber in the first plane. The copper prevents the radiation from causing scintillation in adjacent fibers in the same plane, but allows the radiation to pass and interact with the next layer. The copper layer(s) serve the critical purpose of limiting or reducing alpha and beta particle lateral scatter, thereby improving the position resolution of the detector.

In applications requiring measurements in volume (x, y, z coordinates) rather than planar space (x, y coordinates) several grid planes can be used to instrument and image a three dimensional space. The respective layers provide x-, y-, or z-emission position information. FIG. 4 illustrates two orthogonal grids forming such a detector apparatus. FIG. 5 shows the same apparatus, however, in that figure only the outline of the fiber is shown in order to assist visualization of the overall detection array structure.

The radiation detection system and method advantageously enables isolation of electronic readout components far from the scintillating fiber. Thus a fiber sensor grid array can be located in difficult or hazardous environments, such as buried near and intermixed with the roots of the plant being studied, or in soils contaminated by radiation, without exposing other equipment to such conditions.

The light sensors can be separated from the detection grid and attached as needed. Alternatively, the sensors can be left in place and the more expensive or delicate electronic components can be attached as needed. If the radiation sensor needs to operate in a harsh environment the light sensors can be remotely located, connected by extended wavelength shifting fibers.

There are many commercial applications that require radiation measurement in a variety of geometries. The present invention is easily scalable to readily customize it to a required size or shape. This will allow the sensor to be intimately coupled to what is being measured, thereby permitting greater flexibility in the selection of a radiotracer.

Current markets for this technology include biological research, especially research in the field of plant life. The detection system offers tremendous flexibility in this area. For example, a detection grid array can be buried in whatever growth media the researcher requires to measure the dose distribution in the roots of a plant. In applications involving plant research, the detector grid would typically consist of a single layer. In such applications, the grid is placed into the soil and could, for instance, encircle the root system of a plant or, alternatively, be designed to allow the root system to actually grow through the detector grid permitting direct contact with the root body. Further, several grids could be placed in the path of the growing plant so that the roots could grow through the sensors. Use of this system to detect low level radiation reduces the need for a researcher to work with high-energy isotopes.

The detection system has numerous other uses as well. For example, a detection grid array could be buried in the ground around a nuclear facility. This grid would allow detection of low levels of radioactive material in locations deep underground. It would, for instance, permit the detection of low-level radioactive liquid that may be migrating through the soil. The instant system and method can quantify the escaping radiation levels. Additional markets could be environmental and security monitoring in such applications as water supply and groundwater quality and contamination. There are also potential homeland security applications, such as portal monitoring and monitoring for radiation contamination. In more complex applications, a 3-D matrix detection grid array could be used.

While the invention has been described in reference to certain preferred embodiments, it will be readily apparent to one of ordinary skill in the art that certain modifications or variations may be made to the system without departing from the scope of invention claimed below and described in the foregoing specification.

What is claimed is:

1. A radiation detection system comprising:
    at least two orthogonal grid arrays of scintillating fibers comprising,
    a first grid array of scintillating fibers oriented in a first plane secured to one another along the long axis of each said fiber; said fibers having first and second ends and at least one of said first and second ends being coupled to a light detector;
    a second grid array of scintillating fibers oriented in a second plane secured to one another along the long axis of each said fiber; said fibers having first and second ends and at least one of said first and second ends being coupled to a light detector; and,
    an electron dense material juxtaposed between the scintillating fibers in the first grid array and between the scintillating fibers in the second grid array.

2. A method of radiation detection comprising providing a first and second grid of wavelength-shifting fibers; assembling said grids into an array in which the first and second grid intersect at various locations; securing detection enhancement elements at the locations where said first and second grids intersect; connecting at least one terminal end of each fiber from said first and second grids to a respective light sensor; and, detecting scintillating photons generated by the enhancement elements indicative of the presence of radiation incident upon said array.

3. A radiation detection system comprising:
    at least one grid array of intersecting wavelength-shifting fibers lying in a single plane; said fibers having first and second ends and intersecting one another at essentially right angles;
    a scintillation element serving to receive incident radiation and emit a light signal in response thereto positioned at each location where said fibers intersect; and,
    said first and second ends of said fibers being coupled to light detectors.

4. A radiation detection system comprising:
    a three-dimensional detector matrix formed by a plurality of grid arrays of wavelength-shifting fibers; said grid arrays being composed of a combination of fibers running essentially in an x-direction and fibers running essentially in a y-direction lying; said fibers having first and second ends and crossing one another at essentially right angles;
    a scintillation element serving to receive incident radiation and emit a light signal in response thereto positioned at each location where said fibers cross; and,
    a light detector coupled to at least one of said first and second ends of each said fiber.

* * * * *